United States Patent [19]

Bertram

[11] Patent Number: 5,646,648
[45] Date of Patent: Jul. 8, 1997

[54] MUSICALLY ENHANCED COMPUTER KEYBOARD AND METHOD FOR ENTERING MUSICAL AND TEXTUAL INFORMATION INTO COMPUTER SYSTEMS

[75] Inventor: Randal Lee Bertram, Raleigh, N.C.

[73] Assignee: International Business Machines Corporation, Armonk, N.Y.

[21] Appl. No.: 349,667

[22] Filed: Dec. 5, 1994

[51] Int. Cl.$^6$ .................................................... G10C 3/12
[52] U.S. Cl. .......................... 345/168; 84/423 R; 84/425; 341/22
[58] Field of Search ........................... 84/423 R, 425 R, 84/439 R, 470 R, 478 R, 602, 615, 617, 644, 645, 655, 670, DIG. 7; 341/22, 23; D14/115; D17/7; D18/7; 345/168

[56] References Cited

U.S. PATENT DOCUMENTS

| | | | |
|---|---|---|---|
| D. 367,858 | 3/1996 | Bertram et al. | D14/110 |
| 4,217,803 | 8/1980 | Dodds | 84/1.1 |
| 4,352,313 | 10/1982 | Ny | 84/425 |
| 4,655,117 | 4/1987 | Roose | 84/423 |
| 4,704,940 | 11/1987 | Cummings | 84/425 |
| 4,945,804 | 8/1990 | Farrand | 84/462 |
| 5,088,378 | 2/1992 | DeLaTorre | 84/470 R |

*Primary Examiner*—Mark R. Powell
*Assistant Examiner*—Vincent E. Kovalick
*Attorney, Agent, or Firm*—Calfee, Halter & Griswold; Anthony N. Magistrale

[57] ABSTRACT

A musically enhanced computer keyboard (12) (FIG. 3) having a portion 106 (FIG. 5) resembling a partial piano style keyboard having a standard "QWERTY" alphanumeric key arrangement (102) and a modified function key row arrangement (108). Musical information is entered by using the modified function key row (108) (keys (110) through (128)) as the piano style keyboard's black keys and using the symbol and number keys (130) through (158) as the piano style keyboard's white keys. Textual information is entered by depressing an "Alt" key (168) while concurrently depressing a musical note key (keys (110) through (128)) which causes a textual character associated with the particular key being depressed to appear on a display monitor.

19 Claims, 5 Drawing Sheets

MUSICALLY ENHANCED COMPUTER KEYBOARD AND METHOD FOR ENTERING MUSICAL AND TEXTUAL INFORMATION INTO COMPUTER SYSTEMS

FIELD OF THE INVENTION

The present invention relates generally to computer input devices and, more specifically, to a musically enhanced computer keyboard and method of entering musical and textual information into a computer system.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT (IBM PC/AT), IBM's PERSONAL SYSTEM/1 (IBM PS/1), and IBM's PERSONAL SYSTEM/2 (IBM PS/2).

Personal computer systems are typically used to run software to perform many diverse activities, one of which is the generation and playback of music or other sound. Through the introduction of digital signal processors, multimedia, and fast microprocessors, personal computer systems have brought to the consumer a level of sound realism only achievable in the past by specially designed music systems.

Conventional computer systems usually require the purchase of a specialty input device to allow the user to experience a degree of reality in playing a musical instrument. One such input device is an digital piano style keyboard capable of being interfaced to a personal computer system. Such a device has the advantages of providing the user with the feel and physical layout of a real musical instrument, such as a piano, organ, music synthesizer, or other keyboard instrument. The digital piano style keyboard, however, suffers from several disadvantages: it must be purchased separately from the personal computer system, they are often large and require extra space that is additional to the computer system itself and thus lack portability, the computer system may not be configured with the proper hardware to allow the addition of a digital piano style keyboard, and the user is usually burdened with the inconvenience of a complex installation. Furthermore, the required cost and availability make the digital piano style keyboard undesirable for the novice or beginner interested in using their personal computer system to learn, play, or compose music.

To overcome these disadvantages, inventors have attempted modify or alter standard computer keyboard arrangements to represent the more traditional piano style keyboard. Prior attempts included fastening a piano style keyboard appendage over the computer keyboard such that depressing a piano key would result in a corresponding alpha-numeric key being depressed. These early attempts suffer from the disadvantages of (1) restricting the use of the computer keyboard solely to musical input because the piano style keyboard appendage is fastened on top of the computer keyboard, and (2) the inconvenience of having to unfasten the piano style keyboard appendage each time the user wishes to enter textual information.

Other attempts have focused on associating specific chords and melody notes with specific alpha-numeric keys on the computer keyboard. These attempts have eliminated the inconvenience of having to fasten and unfasten a piano style keyboard appendage to the computer keyboard, but have in the same process also deprived the user of the experience of using the conventional piano style keyboard because the user must associate specific alpha-numeric keys with specific melody notes in a layout which is totally different from a conventional piano keyboard or other keyboards.

It is therefore desirable to provide a computer keyboard that emulates a partial physical appearance and key layout of a piano style keyboard, without the use of external appendages or modification of the standard "QWERTY" keyboard arrangement, and to allow users to enter musical information, in a similar fashion to a real piano style keyboard, while also allowing the entering of textual information.

SUMMARY OF THE INVENTION

According to the present invention, a computer input device and method are provided for entering musical and textual information into a personal computer system, without the use of external appendages or modification of the standard "QWERTY" keyboard arrangement, by providing a musically enhanced computer keyboard that emulates the physical appearance and key layout of a conventional piano style keyboard and be used to generate musical notes or tunes corresponding to the notes on a piano. By emulating the physical appearance and key layout of a conventional piano style keyboard, personal computer users may learn, play, or compose music and lyrics on their computer systems in a more pleasing and traditional method in accord with the methods commonly used in the art of music.

The musically enhanced computer keyboard makes use of a standard "QWERTY" keyboard arrangement, which is well known in the art, having a top or number row of keys and an arrangement of a plurality of general "function" keys commonly found on computer keyboards. The keys of the top or number row of the standard "QWERTY" keyboard arrangement are constructed such that they emulate a piano style keyboard's white keys. The "function" keys are positioned adjacent to and offset with respect to the top or number row and are spaced in intervals representing a piano style keyboard's black keys. The standard "QWERTY" keyboard arrangement is preserved with the top or number row still occupying their standard positions. By means of software control, a control key or logic key may allow for the selection of the function keys and number row keys to either function as "sound" keys to play musical notes or perform their standard function or number inputs.

It is therefore an advantage of the present invention to provide a musically enhanced computer keyboard that permits the entering of musical and textual information without altering the standard "QWERTY" keyboard arrangement.

It is a another advantage of this invention to provide a musically enhanced computer keyboard that exhibits the physical appearance and key layout of a conventional piano style keyboard without increasing the physical size of a computer keyboard.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENT

Figure 1:
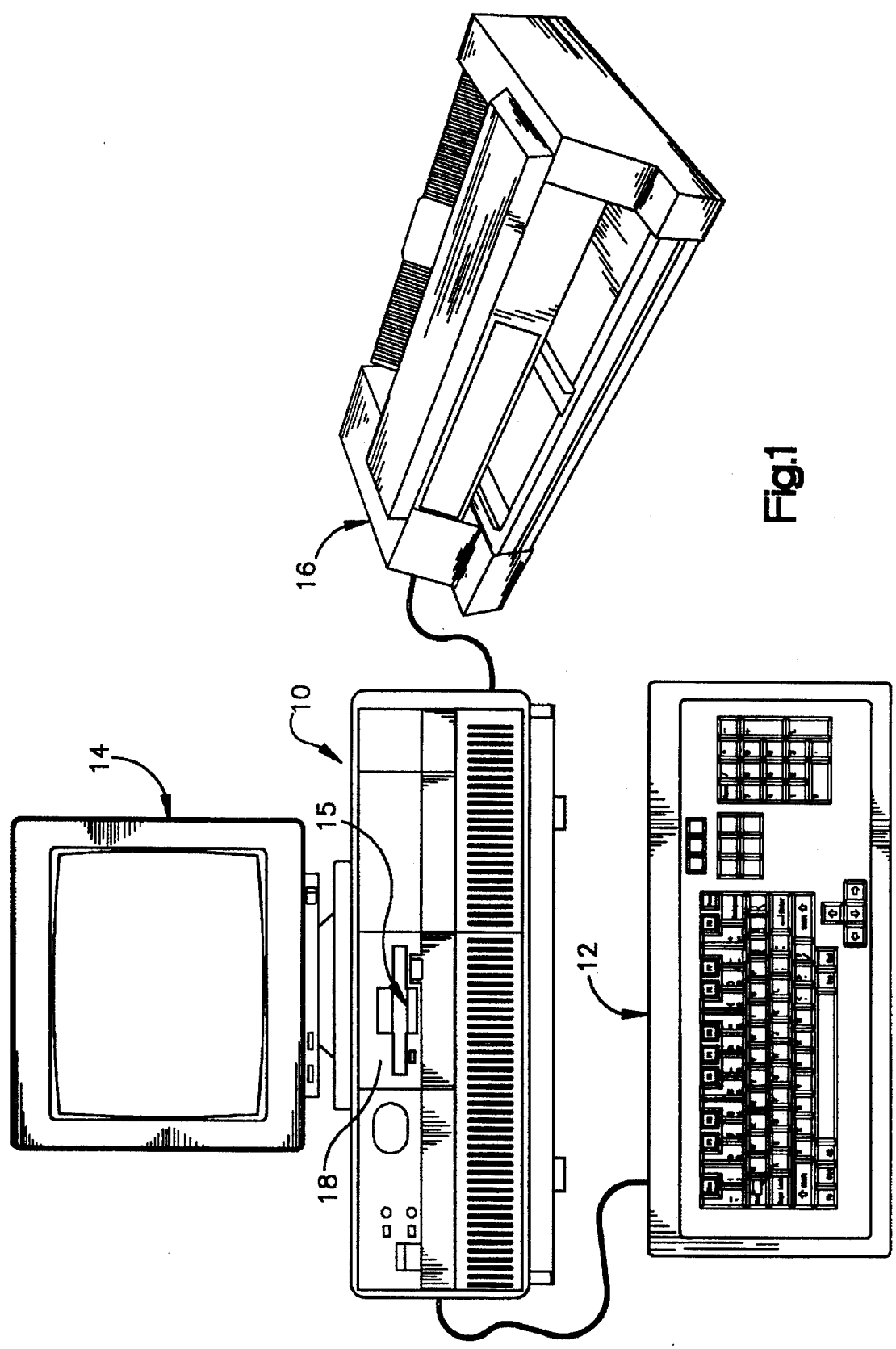
FIG. 1 is a perspective view of a personal computer incorporating the musically enhanced computer keyboard of the present invention.

Referring now to the drawings, and for the present to FIG. 1, a microcomputer embodying the musically enhanced keyboard of the present invention is shown and generally indicated at 10. The computer 10 has an associated monitor 14, musically enhanced keyboard 12 and printer or plotter 16.

Figure 2:
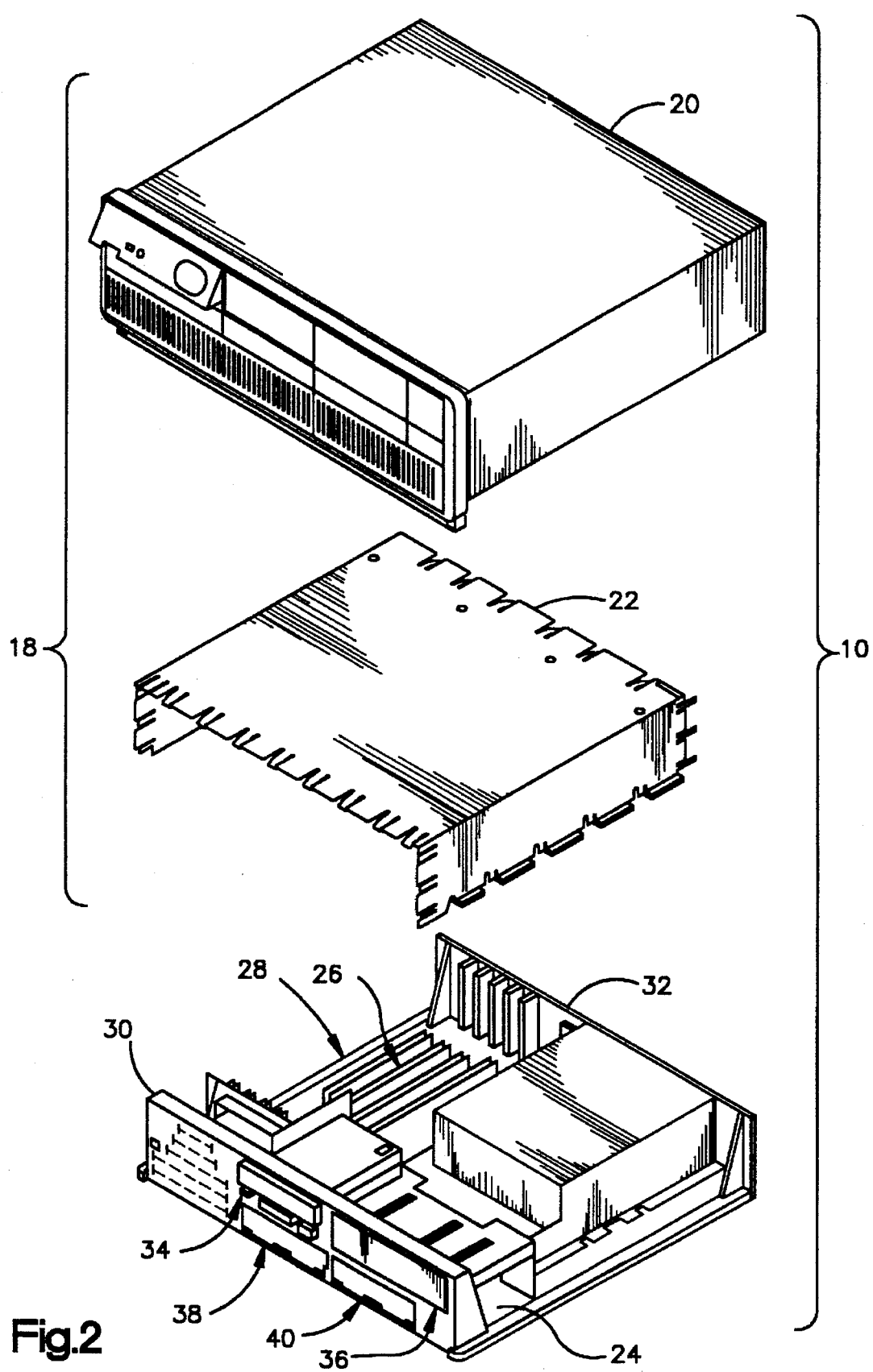
FIG. 2 is an exploded perspective view of certain elements of the personal computer of FIG. 1 including a chassis, a cover, an electromechanical direct access storage device and a planar board, illustrating certain relationships among those elements.

Referring now to FIG. 2, the computer 10 has a cover 18 formed by a decorative outer member 20 and an inner shield member 22 which cooperate with a chassis 28 in defining an enclosed, shielded volume for receiving electrically powered data processing and storage components for processing and storing digital data. At least certain of these components are mounted on a multi-layer planar board 26 or mother board which is mounted on the chassis 28 and provides a structure for electrically interconnecting the components of the computer 10 including those identified above and such other associated elements as floppy disk drives, various forms of direct access storage devices, accessory cards or boards, and the like. As pointed out more fully hereinafter, provisions are made in the planar board 26 for the passage of input/output signals to and from the operating components of the microcomputer.

Still referring to FIG. 2, the chassis 28 has a base indicated at 24, a front panel indicated at 30, and a rear panel indicated at 32. The front panel 30 defines at least one open bay (and in the form illustrated, four bays) for receiving a data storage device such as a disk drive for magnetic or optical disks, a tape backup drive, or the like. In the illustrated form, a pair of upper bays 34, 36 and a pair of lower bays 38, 40 are provided. One of the upper bays 34 is adapted to receive peripheral drives of a first size (such as those known as 3.5 inch drives) while the other bay 36 is adapted to receive drives of a selected one of two sizes (such as 3.5 and 5.25 inch) and the lower bays are adapted to receive devices of only one size (3.5 inch). One floppy disk drive is indicated at 15 in FIG. 1, and is a removable media direct access storage device capable of receiving a diskette inserted thereinto and using the diskette to receive, store and deliver data as is generally known.

Figure 3:
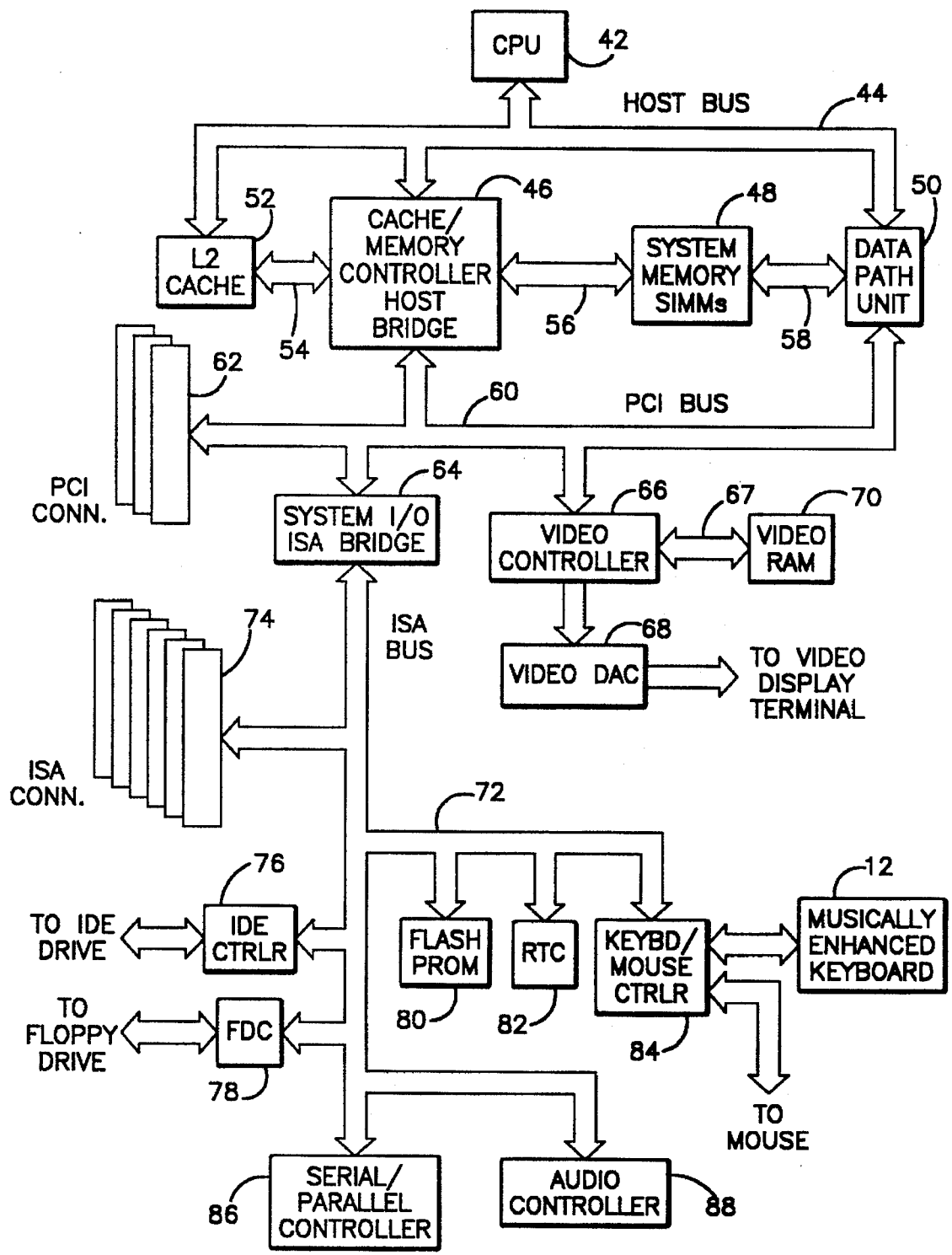
FIG. 3 is a schematic view of certain components of the personal computer of FIGS. 1 and 2.

Prior to relating the above structure to the present invention, a summary of the general operation of the personal computer system 10 merits review. Referring to FIG. 3, there is shown a block diagram of a personal computer system illustrating the various components of the computer system 10 in accordance with the present invention, including components mounted on the planar 26 (shown in FIG. 2) and the connection of the planar to the input/output (I/O) slots and other hardware of the personal computer system. Connected to the planar board 26 (shown in FIG. 2) is the system processor 42. While any appropriate microprocessor can be used as the CPU 42, one suitable microprocessor is the PENTIUM® processor which is sold by Intel Corp. The CPU 42 is connected by a high speed CPU host bus 44 to a cache/memory controller and host bridge 46, data path unit 50, and second level cache memory (L2 cache) 52.

The cache/memory controller and host bridge 46 is connected to the L2 cache 52 via a bus 54 and to a system memory 48 via a bus 56. The cache/memory controller and host bridge 46 integrates the L2 cache 52 and system memory 48 control functions and provides address paths and bus controls for transfers between the Host (CPU 42), system memory 48, and a Peripheral Component Interconnect (PCI) bus 60. The PCI bus employs a 32 bit data bus that supports multiple peripheral components and add-in cards.

During bus operations between the Host (CPU system memory 48, and PCI bus 60, the cache/memory controller and host bridge 46 provides the address paths and bus controls. The cache/memory controller and host bridge 46 also controls data flow through the data path unit 50.

The data path unit 50 provides data path connections between the Host (CPU 42), system memory 48, and PCI bus 60. The system memory 48 is interfaced to the data path unit 50 via a data bus 58 whereby data is transmitted into and out of the system memory 48. The cache/memory controller and host bridge 46 and the data path unit 50 provide a full function data path connection to the system memory 48 and from the PCI bus 60 to a Host subsystem (CPU 42).

The PCI bus 60 is further connected to a plurality of PCI bus expansion slots 62 (three slots are shown), system I/O bridge controller 64, and video controller 66. The system I/O bridge controller 64 provides a bridge between the PCI bus 60 and an Industry Standard Architecture (ISA) bus 72 (or an Enhanced Industry Standard Architecture bus (EISA); not shown) and integrates many of the common I/O functions found in current ISA (or EISA) based PC systems. The video controller 66, which is associated with a video RAM for storing graphic information via a bus 67, is interfaced to the PCI Bus 60 to allow large amounts of data required for high performance graphics to be transmitted quickly to the video controller 66. Video signals generated by video controller 66 may be passed through a Digital to Analog Converter (DAC) 68 to a video display terminal or other display device.

Various peripheral devices are typically connected to the ISA bus 73, such as ISA expansion slots 74 (6 are shown), IDE hard disk controller 76, floppy disk controller (FDC) 78, flash PROM (BIOS) 80, real time clock 82, keyboard/mouse controller 84, serial/parallel controller 86, and audio controller 88. The musically enhanced keyboard 12 is in circuit communication with the CPU 42 and computer system 10 via the keyboard/mouse controller 84.

The audio controller 88 is in the form of an AD1848 SoundPort Stereo Codec component, manufactured by Analog Devices. Alternatively, for personal computer systems without built in sound controllers, a sound card, such as the SOUNDBLASTER manufactured by Creative Labs, or other suitable sound card, may be utilized.

While the above description has been described with some particularity, it is to be understood that the present invention may be used in conjunction with other hardware configurations. For example, other peripheral components such an ETHERNET® controller, multimedia controller, or Small Computer System Interface II (SCSI II) controller may be added to PCI bus 60. Furthermore, the musically enhanced keyboard 12 of the present invention is not dependent on any particular software for its operation and can be used with existing software, such as a word processor like WORDPERFECT® by Wordperfect Corp., as a standard computer keyboard.

Figure 4A:
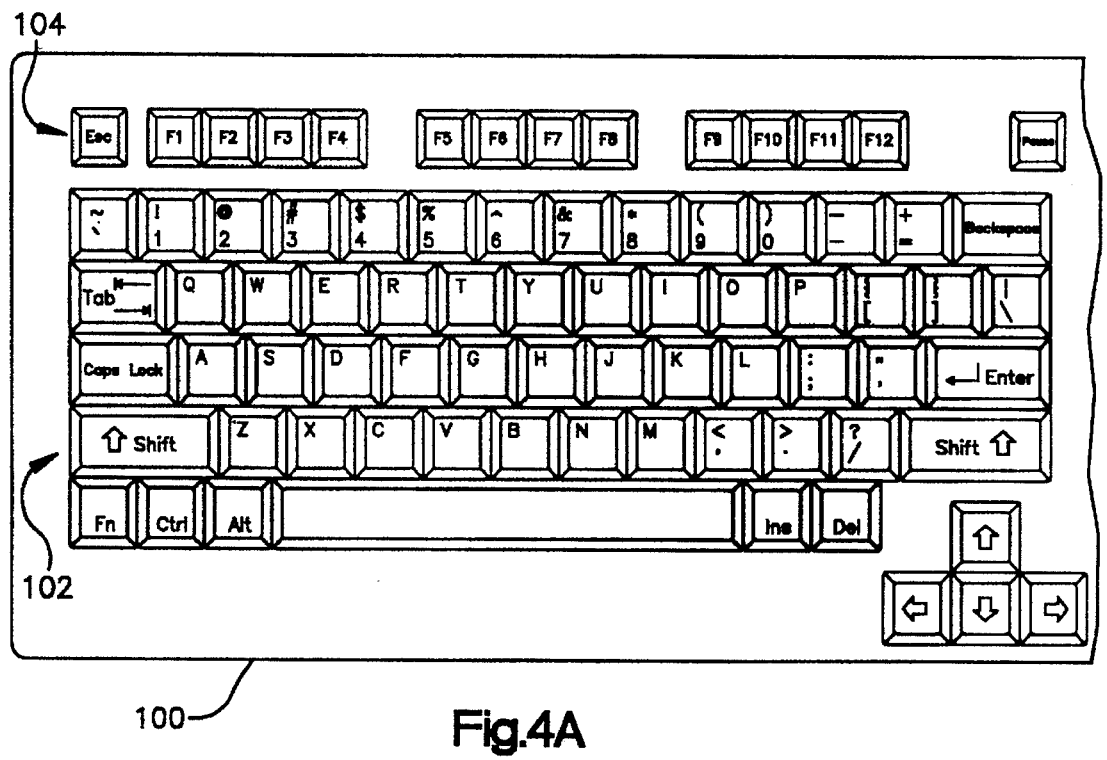
FIG. 4a is a top view of a typical prior art computer keyboard illustrating the keyboard's key arrangement.

Before describing the details of the present invention, a description of a typical computer keyboard may be helpful in understanding the advantages of the musically enhanced keyboard of the present invention. Reference is had, therefore, to FIG. 4a, which shows a portion of a typical prior art computer keyboard 100. The typical computer keyboard 100 has a standard "QWERTY" alpha-numeric keyboard arrangement, indicated generally at 102, and a function key row, indicated generally at 104 (the term "QWERTY" is derived from the keyboard layout in which the first six keys in the first row of letters are "Q", "W", "E", "R", "T", and "Y").

The typical "QWERTY" alpha-numeric keyboard arrangement 102 is very well known in the art and contains other textual symbol keys commonly used in the input of textual information into computer systems. Through such a standard arrangement, a user may go from one computer system to another and input textual information in a relatively easy and efficient manner. The alpha-numeric keys in most computer keyboards are arranged in a manner identical to the arrangement of these keys in conventional typewriters. Arrangement of the function keys is not so standard and may vary in different keyboards. Moreover, such a standard arrangement of alpha-numeric keys is essential to touch typists who have mastered the standard "QWERTY" keyboard arrangement. However, it is to be understood that other standard, but less used keyboard arrangements of the alpha-numeric keys is available. For example, the so called "AZERTY" and Dvorak keyboards arrange the letters and certain symbols differently while maintaining the locations of the number row of keys. Furthermore, keyboards with other standard or non-standard alpha-numeric key arrangements, such as Greek, Russian, Hebrew, Arabic, Sanskrit, Japanese (including Katakana, Hiragana, Kanji), Chinese, Indian, etc. which have a top number row are applicable to the present invention.

The function key row, indicated at 104, is also well known in the art. The function key row generally includes a plurality of function keys and other general purpose keys, such as an "Escape" key or a "Pause" key. The function keys are general purpose keys whose "function" is defined by a particular software program running on the computer system. Thus, one software program may define the function keys to perform certain functions and a second software program may define the same function keys to perform other functions. In this manner, the function keys allow a user to access certain software functions quickly and efficiently by assigning the most commonly used functions to the function keys.

Though the function key row 104 is generally positioned above the standard "QWERTY" alpha-numeric key arrangement 102, such positioning is not standard in the art, nor are the number of functions keys that are available. The positioning and number of function keys is generally dependent on the available space on the computer keyboard and a keyboard designer's general intended use of the keyboard.

Figure 4B:
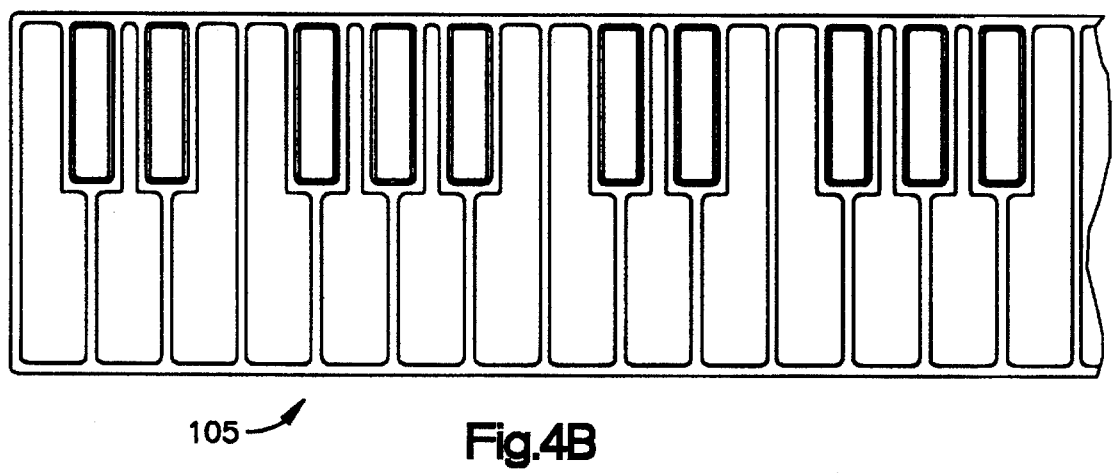
FIG. 4b is a top view of a portion of a conventional piano style keyboard.

While the typical computer keyboard shown at 100 is suitable for most software applications, it is not particularly well suited for musical software applications. Traditionally, music is generated or composed most easily on a piano style keyboard. The layout of keys on a piano style keyboard is well known in the art of music and indicated generally at 105 in FIG. 4b.

The standard "QWERTY" alpha-numeric key arrangement 102 and the common function key arrangement 104 make it difficult to input musical information which is related to a piano style keyboard because the keys are not grouped as in the traditional piano style keyboard arrangement. Thus, one may learn to "play" a piano on the typical computer keyboard 100 and then experience difficulty when attempting to play a real piano.

Under the present invention, the typical computer keyboard 100 is modified so that it emulates the physical appearance and key arrangement of a piano style keyboard while retaining the standard "QWERTY" or other alpha-numeric key arrangement.

Referring to FIG. 3, the musically enhanced keyboard 12 is in circuit communication with the keyboard/mouse controller 84. The musically enhanced keyboard 12 contains circuitry, well known in the art, that generates specific codes based on closure events of the keyboard (i.e. information input through the keyboard, such as a the signal(s) generated by a depression or release of one or more keys). The keyboard/mouse controller 84 contains circuitry, also well known in the art, to interpret the codes generated by the musically enhanced keyboard 12. The CPU 42 can be programmed to scan the musically enhanced keyboard 12 through the keyboard/mouse controller 84 to determine which keys are depressed.

Typically, a CPU 42 may perform a "high" level read, or a "low" level read of a computer keyboard. In the "high" level read, the CPU 42 receives ASCII codes representative of the key(s) depressed. In the "low" level read, the CPU 42 receives "make and break" type signals for each key depressed. Using "low" level reads, the CPU 42 may determine if one or more keys have been depressed and for how long.

In a typical personal computer system, whether the CPU 42 is performing "low" or "high" level keyboard reads depends on the particular software application being used. For example, a word processing application may utilize "high" level reads so that only ASCII codes are sent to the CPU 42 whereas a musical application may utilize "low" level reads so that only "make or break" type signals are sent to the CPU 42. Additionally, an application may also use both types of reads.

A software application may access either of the two types of keyboard reads through the assertion of BIOS interrupt codes. In a typical personal computer system, BIOS interrupt code #9 (HEX) allows for "low" level keyboard reads, and BIOS interrupt code #16 (HEX) allows for "high" level keyboard reads. Through the use of the "low" level reads, the CPU 42 can determine if the user is depressing two or more keys simultaneously to play a musical chord, or individually to play single musical notes.

In other embodiments, the musical keyboard of the present invention may be adapted to generate signals indicating the "velocity" and "touch sensitivity" of the key(s) depressed through the use of sensors and additional control logic. In the art of music and digital piano style keyboards, "velocity" refers to how hard a key is struck (or depressed) and "touch sensitivity" refers to the hardness with which a key is being depressed after it has already been struck. Such features may be readily employed in high-end models of the musically enhanced keyboard of the present invention because the sensors and control logic utilized in the generation of such signals are well known in the art. These features would allow the user to experience all of the features of a high-end digital piano style keyboard without the associated disadvantages.

Figure 5:
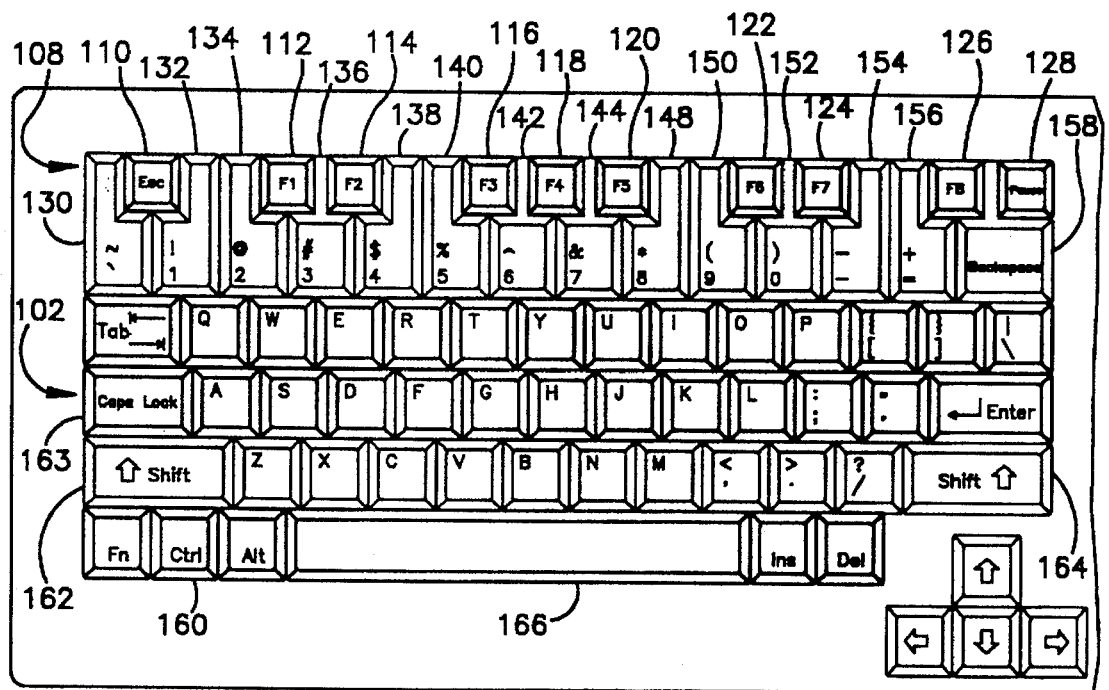
FIG. 5 is a top view of one embodiment of a musically enhanced computer keyboard of the present invention illustrating the enhanced keyboard's key arrangement.

FIG. 5 shows a portion 106 of the musically enhanced computer keyboard 12 of the present invention including the standard "QWERTY" alpha-numeric key arrangement 102 and a modified function key row indicated at 108. The standard "QWERTY" alpha-numeric key arrangement 102, is preserved on the musically enhanced keyboard 12 while the modified function key row 108 is arranged to represent a piano style keyboard's black keys.

The modified function key row 108 includes a plurality of function keys, the individual keys of which are indicated at 110, 112, 114, 116, 118, 120, 122, 124, 126, and 128. A top or number row of the standard "QWERTY" alpha-numeric key arrangement 102 includes a plurality of number and symbol keys, the individual keys of which are indicated at 130, 132, 134, 136, 138, 140, 142, 144, 148, 150, 152, 154, and 156, and a "Backspace" key 158.

To create the physical appearance and key arrangement of a piano style keyboard, the number, symbol, and "Backspace" keys, 130 through 158, are constructed to emulate a piano style keyboard's white keys. The function keys, 110 through 128, are positioned adjacent to and in between the top or number row (keys 130 through 158) and are spaced in intervals representing a piano style keyboard's black keys and offset with respect to the white keys or number keys.

As shown in FIG. 5, the function key 110 is generally positioned adjacent to and in between keys and 132. Keys 130 and 132 are constructed such that they are generally longer than they are wide and a slot is formed by their adjacent positioning to receive the key 110. Similarly, the function key 112 is positioned adjacent to and in between the number and symbol keys 134 and 136. The remaining function keys 114, 116, 118, 120, 122, 124, 126, and 128 are interdigitated in a similar fashion adjacent to and in between the symbol and number keys 136, 138, 140, 142, 144, 148, 150, 152, 154, and 156, and the "Backspace" key 158 as indicated in FIG. 5 ("interdigitated" is defined herein as "interlocked like the fingers of folded hands"). The key arrangement described above and shown in FIG. 5 emulates the physical appearance of a piano style keyboard, with the function keys interdigitated between the number keys to form piano-like black keys and the number and symbol keys forming the side by side piano-like white keys. To further represent a piano style keyboard, the function keys 110 through 128 are provided in black, or other suitable dark colors, and the symbol and number keys 130 through 158 are provided in white or other similar light colors.

Figure 6:
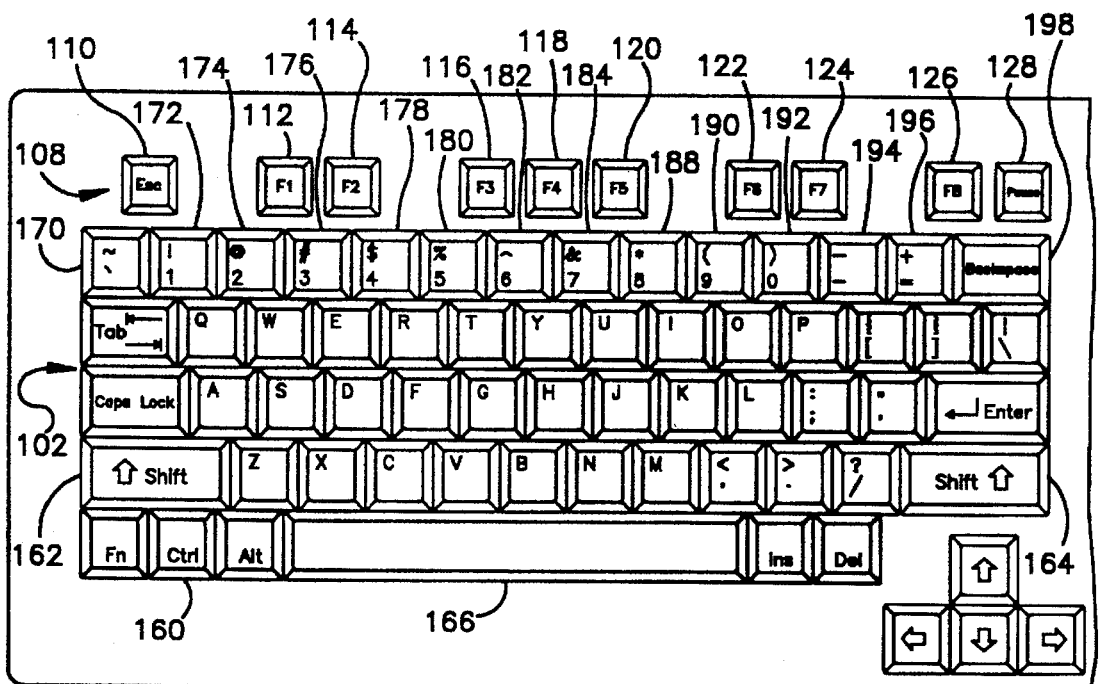
FIG. 6 is a top view of an another embodiment of the musically enhanced keyboard of the present invention illustrating an alternative, enhanced key arrangement.

In another embodiment, shown in FIG. 6, the function keys, 110 through 128, are spaced at intervals representing a piano style keyboard's black keys above the number, symbol, and "Backspace" keys that comprise a top or number row of the standard "QWERTY" alpha-numeric key arrangement 102 (the term "above" as used herein is defined as any point on the computer keyboard furthest from the user and top or number row of the standard "QWERTY" alpha-numeric key arrangement). The number, symbol, and "Backspace" keys, 170 through 198, represent a piano style keyboard's white keys.

As shown in FIG. 6, the function key 110 is generally positioned above and offset with respect to the number and symbol keys 170 and 172. Similarly, the function key 112 is positioned above and offset with respect to the number and symbol keys 174 and 176. The remaining function keys 114, 116, 118, 120, 122, 124, 126, and 128 are positioned in a similar fashion above and offset with respect to the symbol and number keys 176, 178, 180, 182, 184, 188, 190, 192, 194, and 196, and the "Backspace" key 198 as indicated in FIG. 6.

Using the musically enhanced computer keyboard 12 of the present invention allows a computer user to learn, play, and compose music on a computer keyboard that has the physical appearance of a piano style keyboard. The computer user may depress a key in the modified function key row 108, in much the same manner as the user would depress a black key on a real piano style keyboard, and obtain a "sharp" or a "flat" of a musical note. Depressing the symbol and numeric keys 130 through 158 would produce the musical note in its standard pitch, in much the same manner as if the user would depress a white key on a real piano style keyboard.

Through properly programmed software, the user may raise or lower the octave (frequency) of a musical note by depressing a "Shift" key, indicated at 162 and 164, or a "Ctrl" key 160. For example, depressing the "Shift" key 162 while depressing a musical note key (keys 110 through 158) would cause a note to be played an octave higher. Similarly, depressing the "Ctrl" key 164 while depressing a musical note key (keys 110 through 158) would cause the musical note to be played an octave lower higher. In other embodiments, the remaining non alpha-numeric keys may also serve this function. It is also apparent that any key or combination of keys may be programmed to accomplish this function. For example, a "lock" key, such as "Caps Lock" 163, may be depressed to raise the octave of all or some of the musical note(s) played or entered. The "Shift" key 162 and "Ctrl" key 160 would still perform their usual functions, namely, the "Shift" key 162, when depressed, would further raise the octave of the musical note(s) entered or played and the "Ctrl" key 160, when depressed, would lower the octave of the musical note(s) entered or played.

By using the modified function key row 108 (keys 110 through 128) as the piano style keyboard's black keys and using the symbol and number keys 130 through 158 as the piano style keyboard's white keys, the computer user can learn to play or compose music on a personal computer system and then easily play the same music or compose new music on a real piano, organ, synthesizer, or other keyboard instrument. Conversely, a user familiar with the traditional piano style keyboard can easily practice or compose music on the musically enhanced computer keyboard without the hardship of having to master the typical computer keyboard arrangement 100 (shown in FIG. 4).

Furthermore, the musically enhanced computer keyboard 12 allows a computer user to play and compose music and write lyrics concurrently on a personal computer system through properly programmed software. Musical information can be entered by using the modified function key row 108 (keys 110 through 128) as the piano style keyboard's black keys and using the symbol and number keys 130 through 158 as the piano style keyboard's white keys.

Textual information can be entered to write lyrics simultaneously with musical information by using the alphabetical keys on the alpha-numeric key arrangement 102. For example, a user may produce musical notes "A", "B", and "C", by depressing the keys 130, 132, and 134, in any combination, and then type the word "lyric" by depressing the alphabetic keys "L", "Y", "R", "I", and "C" on the alpha-numeric key arrangement 102 in the same fashion as the user would on a word processor. Moreover, a musical program can be created to temporally store and retrieve lyrics and musical information and produce, in effect, a song or melody.

The textual characters associated with the number and symbol keys 130 through 158 are produced by using software to define the "Alt" key 168 to toggle between musical and textual modes of data entry. For example, depressing the "Alt" key 168 would initiate a textual mode of data entry. Accordingly, a sequential depressing of any group of at least one key of the musical note keys (i.e. number and symbol keys 110 through 128) while depressing the "Alt" key 168 would cause textual characters associated with the particular number and symbol keys being depressed to appear on a display monitor. In other embodiments, software may be programmed to define any of the remaining non alpha-numeric keys to also serve this function. It is also apparent that any key or combination of keys may be programmed to accomplish this function.

Thus, the musically enhanced computer keyboard 12 permits a user to enter musical and textual information while preserving the standard "QWERTY" keyboard arrangement. Furthermore the musically enhanced computer keyboard 12 emulates the physical appearance and key layout of a conventional piano style keyboard without increasing the physical size of a computer keyboard. By providing such qualities, the musically enhanced keyboard provides a novice, as well as a master, a relatively easy means of producing music and lyrics on a person computer system with the proper musical software. The following is a partial list of commercially available software that would allow a user to employ the musically enhanced keyboard of the present invention as a standard computer keyboard to enter both musical and textual information:

Musictime 2.0 by Passport Designs, Inc.;
Musicwriter 1.4 by Pygraphics;
SongWright 5.1 by SongWright;
The Note Processor by M Power (thoughtprocessors);
Mosaic by Mark of the Unicorn.

Other programs that allow musical input and limited textual input include:

Cakewalk Professional by Twelve Tone Systems;
Master Tracks Pro. 4.9 and 5.2 by Passport Designs, Inc.;
Personal Composer for Windows 1.0 by Personal Composer.

These commercially available programs, and others like them, may be readily adapted to use the features of the musically enhanced keyboard of the present invention by adopting the means and methods described herein through software programming modifications.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the number of function keys in the function row 108 may be increased if space is available, so long as the piano style keyboard arrangement is preserved, a space bar 166 can be used increase a musical note's duration. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A computer keyboard for the input of textual and musical information into a computer system, comprising:
    (a) a plurality of alpha-numeric keys comprised of a top row of number keys having a shape corresponding to a piano style keyboard's white keys;
    (b) a plurality of function keys positioned adjacent to and offset with respect to said number keys and spaced in intervals with relationship to said number keys to positionally correspond to a piano style keyboard's black keys.

2. The computer keyboard of claim 1 wherein the number keys comprise a plurality of side by side piano-like shaped white keys.

3. The computer keyboard of claim 2 wherein the function keys are interdigitated between the number keys to form piano-like black keys.

4. A computer system for the input of musical and textual information having a CPU, keyboard controller, and a keyboard wherein,
    (a) said CPU is in circuit communication with said keyboard controller,
    (b) said keyboard controller is in circuit communication with said keyboard, and configured to assert certain signals to the CPU responsive to at least one closure event of the keys of said keyboard,
    (c) said keyboard comprising:
        (1) a plurality of alpha-numeric keys comprised of a top row of number keys having a shape corresponding to a piano style keyboard's white keys;
        (2) a plurality of function keys positioned adjacent to and offset with respect to said top row of number keys and spaced in intervals with relationship to said number keys to positionally correspond to a piano style keyboard's black keys; and
        (3) code generation circuitry configured to assert particular codes responsive to at least one closure event of (1) said function keys, (2) said number keys and (3) a plurality of keys not positioned in said number keys to produce (i) musical tone information corresponding to a piano style keyboard's black keys, (ii) musical tone information corresponding to a piano style keyboard's white keys, and (iii) concurrently with producing either of said musical tone information, produce textual information respectively.

5. The system of claim 4 further comprising at least one other key configured to produce textual information associated with said number keys.

6. The computer keyboard of claim 4 wherein the number keys comprise a plurality of side by side piano-like white keys.

7. The computer keyboard of claim 6 wherein the function keys are interdigitated between the number keys to form piano-like black keys.

8. A method of generating musical information with the aid of a digital computer and a keyboard, which keyboard is comprised of a plurality of alpha-numeric keys having
a top row of number keys having a shape corresponding to a piano style keyboard's white keys, and
a plurality of function keys positioned adjacent to and offset with respect to said number keys and spaced in intervals with relationship to said number keys to positionally correspond to a piano style keyboard's black keys, comprising the steps of:

(a) detecting a closure event of at least one key of said plurality of function keys to produce musical information corresponding to a piano style keyboard's black keys;

(b) detecting a closure event at least one key of the number keys to produce musical information corresponding to a piano style keyboard's white keys.

9. The method of generating musical information as recited in claim 8, further comprising the steps of:

(a) detecting a closure event of at least one other key on the keyboard with any group of at least one key in said plurality of function keys and number keys;

(b) changing the musical information upon said detection of the closure event of at least one other key on the keyboard with any group of at least one key in said plurality of function keys and number keys.

10. The method of generating musical information recited in claim 9 wherein said at least one other key comprises a "Shift" key.

11. The method of entering musical information recited in claim 9 wherein said at least one other key comprises a "Ctrl" key.

12. The method of entering musical information recited in claim 9 wherein said at least one other key comprises an "Alt" key.

13. The method of entering musical information recited in claim 9 wherein said at least one other key comprises a lock key.

14. A method of generating musical and textual information with the aid of a digital computer and a keyboard, which keyboard is comprised of a plurality of alpha-numeric keys having
a top row of number keys having a shape corresponding to a piano style keyboard's white keys, and
a plurality of function keys positioned adjacent to and offset with respect to said number keys and spaced in intervals with relationship to said number keys to positionally correspond to a piano style keyboard's black keys, comprising the steps of:

(a) detecting a closure event of at least one key of a plurality of function keys to produce musical information corresponding to a piano style keyboard's black keys;

(b) detecting a closure event of at least one key of said number keys to produce musical information corresponding to a piano style keyboard's white keys;

(c) concurrently with either of said detecting steps, detecting a closure event of any group of at least one key of said plurality of alpha-numeric keys not positioned in said number keys to produce textual information.

15. The method of generating musical and textual information as recited in claim 14, further comprising the steps of:

(a) detecting a closure event of at least one other key on the keyboard with any group of at least one key of said number keys;

(b) generating textual information upon said detection of the closure event of at least one other key on the keyboard with any group of at least one key of said number keys.

16. The method of generating musical and textual information as recited in claim 14, further comprising the steps of:

(a) detecting a closure event of at least one second other key on the keyboard with any group of at least one key of said plurality of function keys and said number keys;

(b) changing the musical information upon said detection of the closure event of at least one second other key on the keyboard with any group of at least one key of said plurality of function keys and said number keys.

17. The method of entering musical and textual information as recited in claim 14 wherein said at least one first other key comprises an "Alt" key.

18. The method of entering musical and textual information as recited in claim 14 wherein said at least one second other key comprises a "Ctrl" key.

19. The method of entering musical and textual information as recited in claim 14 wherein said at least one second other key comprises a "Shift" key.

* * * * *